March 18, 1947. G. V. RYLSKY 2,417,704
SYSTEM FOR USING THE SCANNING BEAM OF LIGHT FOR INSTRUMENTS
Filed July 12, 1943 2 Sheets-Sheet 1
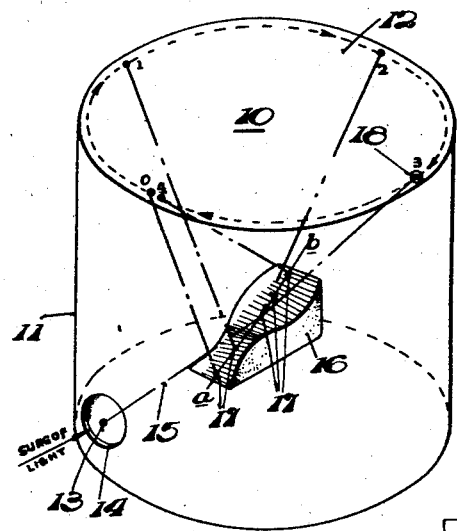
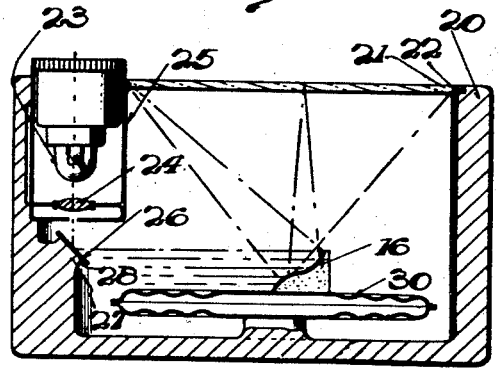
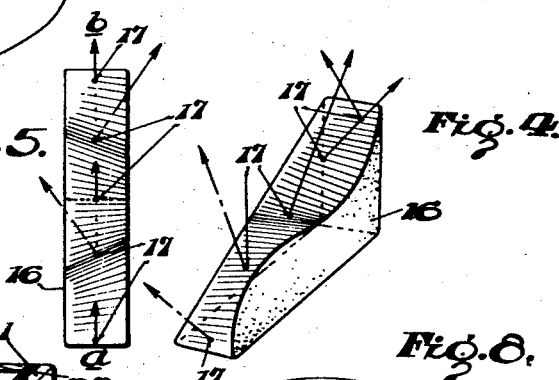
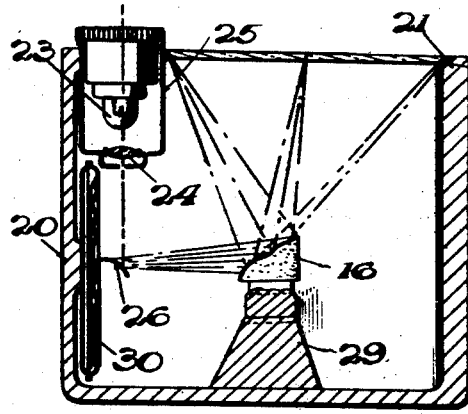
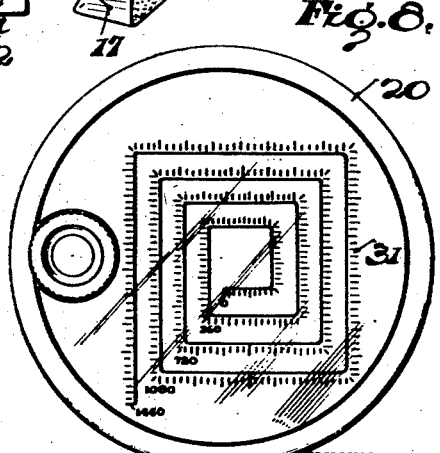
INVENTOR.
Gregory V. Rylsky.
BY Herbert M. Birch
Attorney March 18, 1947.  G. V. RYLSKY  2,417,704
SYSTEM FOR USING THE SCANNING BEAM OF LIGHT FOR INSTRUMENTS
Filed July 12, 1943  2 Sheets-Sheet 2

INVENTOR.
Gregory V. Rylsky.
BY Herbert M. Birch.
Attorney

Patented Mar. 18, 1947

2,417,704

UNITED STATES PATENT OFFICE 2,417,704

SYSTEM FOR USING THE SCANNING BEAM OF LIGHT FOR INSTRUMENTS

Gregory V. Rylsky, Ridgefield Park, N. J., assignor to Bendix Aviation Corporation, Teterboro, N. J., a corporation of Delaware Application July 12, 1943, Serial No. 494,376

8 Claims. (Cl. 88—24)

The present invention relates to indicating means generally and more particularly to a novel indicating instrument adapted to provide accurate indications in units progressively in conformity with any chosen design of scale markings.

One object of the present invention is to provide novel indicating means for optically providing progressive indications in units of measure in response to condition responsive means.

Another object of the invention is to provide a novel optically controlled means to simultaneously indicate and illuminate an indicator scale having markings of any chosen shape.

Another object is to provide a simple and novel indicating means, adapted to make it practical to vary the shapes of conventional indicating scales and thereby unlimitedly increase the extent of indications in units thereon by utilization of shapes, such as concentric circles, spiral scale lines, elliptical scale lines, straight-line scale lines arranged in sequence and the like.

Another object is to provide in a novel optical indicating system, novel means designed to angularly reflect and project a beam of light as an indicating spot, whereby the said indicating spot of light is adapted to progressively traverse a calibrated scale marked surface from a point zero in any direction of indication along the calibrated scale marked surface.

Still another object is to provide a novel indicating instrument including novel reflecting means in combination with a condition responsive means, whereby a beam of light may be scanned and progressively reflected and thereafter projected as a spot around the periphery of a translucent dial surface on the periphery of which is marked a scale having a circular path.

A further object of the invention is to provide an indicating instrument having novel means defining a surface of revolution adapted to project a beam of light onto a calibrated scale whereby a change in a condition being measured may be readily observed.

A still further object is to provide a novel indicating instrument which does away with the use of a pointer together with all of its surrounding and necessary operating linkage so that it is inexpensive to manufacture and simple in operation.

The above and other objects and advantages of the present invention will appear more fully hereinafter from a consideration of the detailed description which follows, taken together with the accompanying drawings wherein three embodiments of the invention are illustrated. It is to be expressly understood, however, that the drawings are for the purpose of illustration only and are not designed as a definition of the limits of the invention.

Reference for a definition of the scope of the invention should be had to the appended claims.

In the drawings wherein like reference characters refer to like parts throughout the several views:

Figure 1 is a general diagrammatic illustration partly in perspective of the novel optical system employed in one embodiment of the invention.

Figure 2 is a side section view of an instrument including a pressure responsive element of another embodiment.

Figure 3 is still another embodiment of an instrument similar in principle to that of Figure 2.

Figure 4 is an isometric view of the novel reflector per se.

Figure 5 is a top elevation of the reflector surface with arrows to indicate several plotted angles of reflection.

Figure 8 is another form of scale where over 360° of indication are provided.

Figure 6:
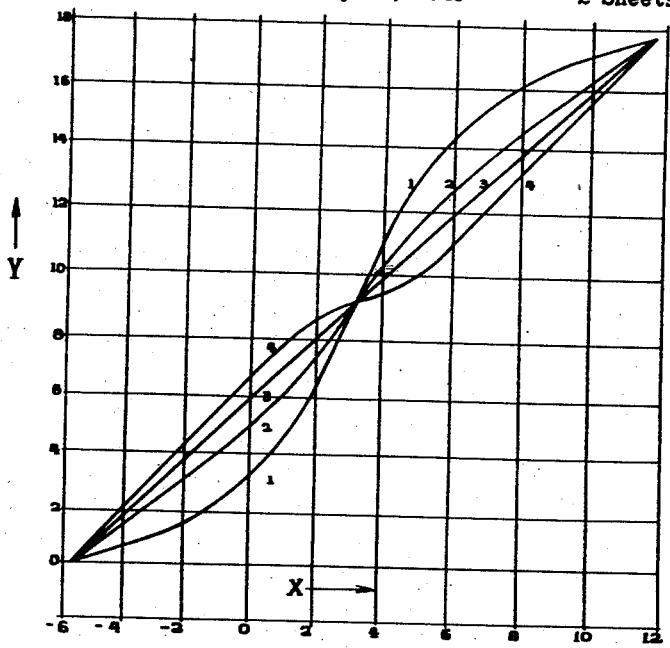
Figure 6 is a graphic diagram of the reflecting surface curves to a specific scale indication.

Referring in detail to the form illustrated in Figure 1 of the drawings, numeral 11 designates a casing at the top of which is shown a translucent screen or dial 10 upon which a circular scale 12 is printed. The scale 12 may be circular, elliptical, spiral, plural lined, or any suitable design. A form of spiral scale, for example is illustrated in Figure 8 and is described in detail hereinafter.

Associated with the lower interior wall and bottom of casing 11 is a suitable source of light, such as light bulb 13 and light reflector housing 14 adapted to direct a beam of light 15 in a path substantially parallel to the plane of scale 12.

Positioned in the course of light beam 15 is a novel scanning reflector 16 with a helically twisted or skewed reflecting surface. The twisted reflecting surface has a plurality of approximately conical reflecting areas 17, which are so shaped and positioned along either side of center curved line a—b, extending longitudinally of reflector 16, that substantially parallel fixed light beam 15, when scanned by reflector 16 along line a—b will be reflected and intercepted as a spot 18 on scale 12 at point 3 or, as indicated by the index lines shown in Figure 1, to any of the points zero, 1, 2, 3 or 4 that may be marked on scale 12.

The novel scanning reflector 16 may be moved to give such scanning indications by any suitable condition responsive device toward or away from scale 12, and the reflecting areas, broadly designated by numeral 17, are progressively located, so that the direction of movement toward or away from the scale 12 shall determine whether spot 18 rotates counter-clockwise or clockwise around the scale surface 12.

*Operation of Figure 1*

The device in Figure 1 embodies the source of light 13 and one helically twisted scanning reflector 16 with a plurality of approximately conical areas having a plurality of reflecting points each adapted to scan the light beam, so as to reflect and project a light spot 18 to the translucent surface 10 of the circular scale 12 divided in units, when a condition responsive means, not shown, attached to the scanning reflector 16, moves toward or away from the scale in a vertical line.

As the scanning reflector 16 moves away from scale 12, for example, it scans the light beam and spot 18, generated by light beam 15, is projected to the translucent scale surface 10, and moves clockwise from unit to unit on the scale 12, until movement stops. If, however, the movement is reversed and scanning reflector 16 moves toward scale 12, a reverse scanning action takes place and the light spot 18 moves counter-clockwise.

Figure 2 illustrates another form of the invention. In this form is shown an outer casing 20, a suitable cover glass bearing a translucent scale 21, seated in the top thereof on flange 22, and radially positioned from the center of the casing; a source of light, such as bulb 23, lens 24 and light housing 25; and a light reflecting means, such as reflector 26.

Light housing 25 is associated with the wall of casing 20, above a projection 27 having a surface 28 angularly displaced with respect to the light rays from bulb 23, and to which is secured auxiliary reflector 26.

Lens 24 and auxiliary reflector 26 collimate the light rays into a narrow beam of substantially parallel rays, the cross-section of which beam is substantially the desired diameter of the projected light indicating spot on scale 21.

In the path of the fixed light beam is positioned a novel scanning reflector 16 having a skewed reflecting surface identical to that described in connection with the structure of Figure 1 and shown in Figures 4 and 5. The scanning reflector 16, shown in Figure 2, is secured to a condition responsive element 30, which may be an expansible and contractible aneroid or diaphragm, so that when the element 30 responds to variations in a condition being measured, the scanning reflector 16 is moved across the fixed light beam. The resulting operation is now the same as previously described in connection with the form illustrated and described in Figure 1.

Figure 3 illustrates another form of the invention. The elements of this form are broadly the same as those of Figure 2 and are accordingly given the same reference numerals. This embodiment distinguishes over Figure 2 in that the condition responsive element 30 is secured to the wall of casing 20 and auxiliary reflector 26 is carried by the element 30, instead of the skewed curve scanning reflector 16 being so carried. Reflector 16 is fixed to a stationary base 29.

For an example of non-conventional scale markings, see Figure 8, which shows a spiral scale 31 to provide for a beam spot rotation up to 1440° instead of 360°. To this end, scanning reflector 16 is skewed or machined to reflect in four cycles, so as to direct the indicating light spot in the four rotations necessary to progressively traverse scale 31.

Figure 6 illustrates the effective surface contour of one form of a scanning reflector, such as is shown in isometric view in Figure 4. The reflecting surfaces 17 are here graphically illustrated and may be determined and plotted for machining by determination of the coordinates of any desired number of points ($x$ and $y$) in each of the curves formed by the reflecting surfaces in selected planes parallel to the $x$—$y$ plane. In the particular problem illustrated in Figures 6 and 7, the light traversing line a—b (Figure 5) is shown as line 2—2 which lies in the chosen "zero" plane or third dimensional plane; lines 1—1, 3—3, and 4—4 lie in planes parallel to this "zero" plane—as described below. The reflecting surface per se is determined or generated, by straight lines in planes of constant X, which lines intersect each of the four curves (1—1, 2—2, 3—3, 4—4) in their respective planes.

The reflecting surfaces are plotted for machining by determination of the coordinates of any desired number of points $x$ and $y$ in each of the curves (such as 1—1, 2—2, 3—3, 4—4 of Figure 6) to be formed in the reflecting surface in selected planes parallel to the X—Y (or "zero") plane. As the reflecting surface of reflector 16 only moves by translation (without rotation) in the Y direction, the light beam will always strike the reflecting surface along line a—b, Figures 1 and 5.

For example, line 2—2, (see Figure 6), lies in the zero ($Z=0$, or "X—Y") plane; line 1—1 lies in a plane positioned above the plane of the drawing, in a plane parallel to that "zero" plane in which line 2—2 lies, at a distance ($z$) of plus 5 units from (above) that zero plane; line 4 lies in the Z-plane which is spaced 5 units below the zero plane; and line 3 lies in the Z-plane which is spaced 2.74 units below the zero plane or line 2—2 (represented by the plane of the drawing).

In this manner, the extent of progressively machining or cutting a suitable piece of material to produce the desired novel skewed reflector surface is determined in measuring units based from a plurality of straight lines each of which is parallel to the Y—Z plane in the material to be machined; that is, the translatory axis of rotation of a straight line traversing cutting implement remains parallel to the X-axis in the material.

The number of straight lines actually determining the described reflecting surface is exceedingly great (theoretically infinite) since the determining lines (1—1, 2—2, 3—3, and 4—4 of Figure 6) are smooth curves through calculated values of X and Y in each plane of constant Z. In manufacturing, the reflecting surface is made smooth (or continuous) by polishing to remove irregularities due to machining.

Figure 7:
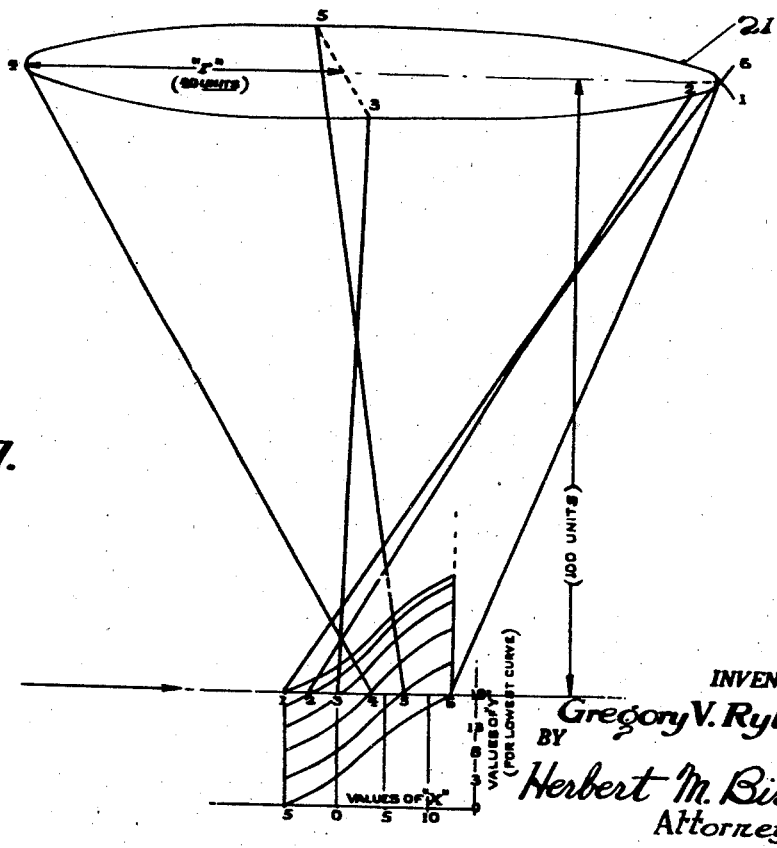
Figure 7 is a similar view to show the relation of the center curve of the reflecting surface to a circular scale calculated for six progressive positions of the indicating spot in one revolution.

Figure 7 is a graphic view in values of X and Y of the center curve 2—2 of the reflecting surface 16 of Figure 2 and Figure 6, plotted for six points or condition values of element 30, and positioned from circular scale 21 so that the condition-responsive element 30 of Figure 2 moves scanning reflector 16 in a line perpendicular to the center of scale 21; which scale in this instance may have a radius of 40 units. The light beam is arranged to cross the perpendicular line of movement of scanning reflector 16 at zero position and at any predetermined distance from scale 21 for proper calibration; in the drawing this is arbitrarily chosen to be 100 units from the scale 21, so that point 1 equals 0, point 2 equals 35°, point 3 equals 90°, point 4 equals 180°, point 5 equals 270°, and point 6 equals 360° and, so that each 20° movement of the indicating spot from "zero position" on scale 21 is caused by one unit of displacement of the scanning surface (that is 360° rotation of the light spot will be due to a movement of the scanning surface of 18 units or a 720° rotation of the spot would be a movement of 36 units).

A rotation of the light spot of greater angle than 360° is more useful in connection with a spiral or a concentric scale line 31, as shown in Figure 8, so that points for a greater rotation of the light spot will not overlap, and interfere with successful indications beyond the usual 360° rotation.

There is thus provided a novel means of utilizing a beam of light for producing readings on scale markings of many shapes for any progressive extent of indication beyond conventional limitations without the use of mechanical couplings subject to wear and without being subject to the inaccuracies of such mechanical coupling operated indicators in which limiting stops are used in the extremity regions thereof.

While only three structural embodiments of the invention have been illustrated and described, various changes and modifications, which will now appear to those skilled in the art, may be made without departing from the scope of the present invention. Reference is therefore to be had to the appended claims for a definition of the limits of the invention.

What is claimed is:

1. Apparatus for simultaneously illuminating a dial and giving indications thereon comprising in combination a casing, a source of light, light collimating means within the casing in line with said source of light, a pressure sensitive member mounted in said casing, and a second collimated light reflecting means carried by said pressure sensitive member adapted to progressively, selectively and automatically project the collimated light into a plurality of individual angularly projected illuminating and indicating spots on said dial with each displacement of said light reflecting means by said pressure sensitive member.

2. Apparatus for instrument indications, comprising a casing, a dial supported on the casing, a source of light, means for passing said light from said source as a single light beam, movable measuring means secured to a side of said casing, a light beam reflector below the source of light secured to said measuring means, and a skewed curve reflector surface secured to said casing in the path of said moving beam of light, parallel to said dial, adapted to project said light beam to the surface of said dial at different angles in accordance with the raising or lowering of said light beam reflector secured to said measuring means.

3. The combination in an indicating instrument with a source of light and means for producing a restricted horizontal light beam from said source, of a skewed reflector surface mounted in the path of travel of said horizontal beam of light adapted to reflect said beam through a plurality of paths of variable angles, and a scale having each portion thereof in one path of travel of each angular position of the reflected portion of said light beam, said scale having units of indication thereon at different radii from a common center point of the instrument, whereby said scale intercepts said reflected portion of said light beam at each unit of indication as a light spot.

4. The combination in an indicating instrument having a transparent calibrated dial together with means including a light source for providing a restricted beam of light, of a scale on said dial having units of indication at different radii from a common center point of said dial, a reflector arranged in the path of said beam and having a helical reflecting surface so formed as to produce reflection and rotation of said beam upon said scale in accordance with the condition to which said indicating instrument is responsive.

5. The combination in an indicating instrument having a transparent calibrated dial together with means including a light source for providing a restricted beam of light, of a scale on said dial having units of indication at different radii from a common center point of said dial, a reflector member arranged in the path of said beam and having a helically skewed reflecting surface so formed as to produce reflection and rotation of said beam upon said scale in accordance with the condition to which said indicating instrument is responsive.

6. The combination in an indicating instrument having a transparent calibrated dial together with means including a source of light for providing a restricted beam of light, of a scale on said dial having units of indication at different radii from a common center point of said dial, a reflector arranged in the path of said beam and having a helically skewed reflecting surface so formed as to define a continuous surface of revolution for the reflected beam upon said dial.

7. The combination in an indicating instrument having a transparent calibrated dial together with means including a source of light for providing a restricted beam of light, of a scale on said dial having units of indication at different radii from a common center point of said dial, a linearly movable member arranged in the path of said beam and having a helically skewed and continuously twisted reflecting surface so formed as to produce reflection and rotation of said beam upon said scale in accordance with the condition to which said indicating instrument is responsive.

8. The combination in an indicating instrument having a calibrated dial together with means including a source of light for providing a restricted beam of light, of a scale on said dial having units of indication at different radii from a common center point of said dial, a reflector having a helically twisted reflecting surface in the path of said beam whereby said beam is reflected on to said scale in accordance with the condition to which said indicating instrument is responsive in a continuous angularly changing path.

GREGORY V. RYLSKY.

REFERENCES CITED

The following references are of record in the file of this patent:

UNITED STATES PATENTS

| Number | Name | Date |
|---|---|---|
| 1,518,786 | Griswold | Dec. 9, 1924 |
| 2,057,927 | Smith | Oct. 20, 1936 |
| 1,790,491 | Smith | Jan. 27, 1931 |
| 2,098,476 | Webster | Nov. 9, 1937 |
| 2,273,876 | Lutz | Feb. 24, 1942 |
| 1,074,260 | Guerrant | Sept. 30, 1913 |
| 1,670,310 | Miller | May 22, 1928 |
| 847,058 | Gaillard | Mar. 12, 1907 |
| 2,112,570 | Spacher | Mar. 29, 1938 |
| 2,245,970 | Frantz | June 17, 1941 |
| 2,143,011 | De Juhasz | Jan. 10, 1939 |
| 1,947,280 | Thearle | Feb. 13, 1934 |
| 1,753,697 | Gardner | Apr. 8, 1930 |

FOREIGN PATENTS

| Number | Country | Date |
|---|---|---|
| 706,102 | German | May 17, 1941 |
| 706,101 | German | May 17, 1941 |